Patented June 21, 1932

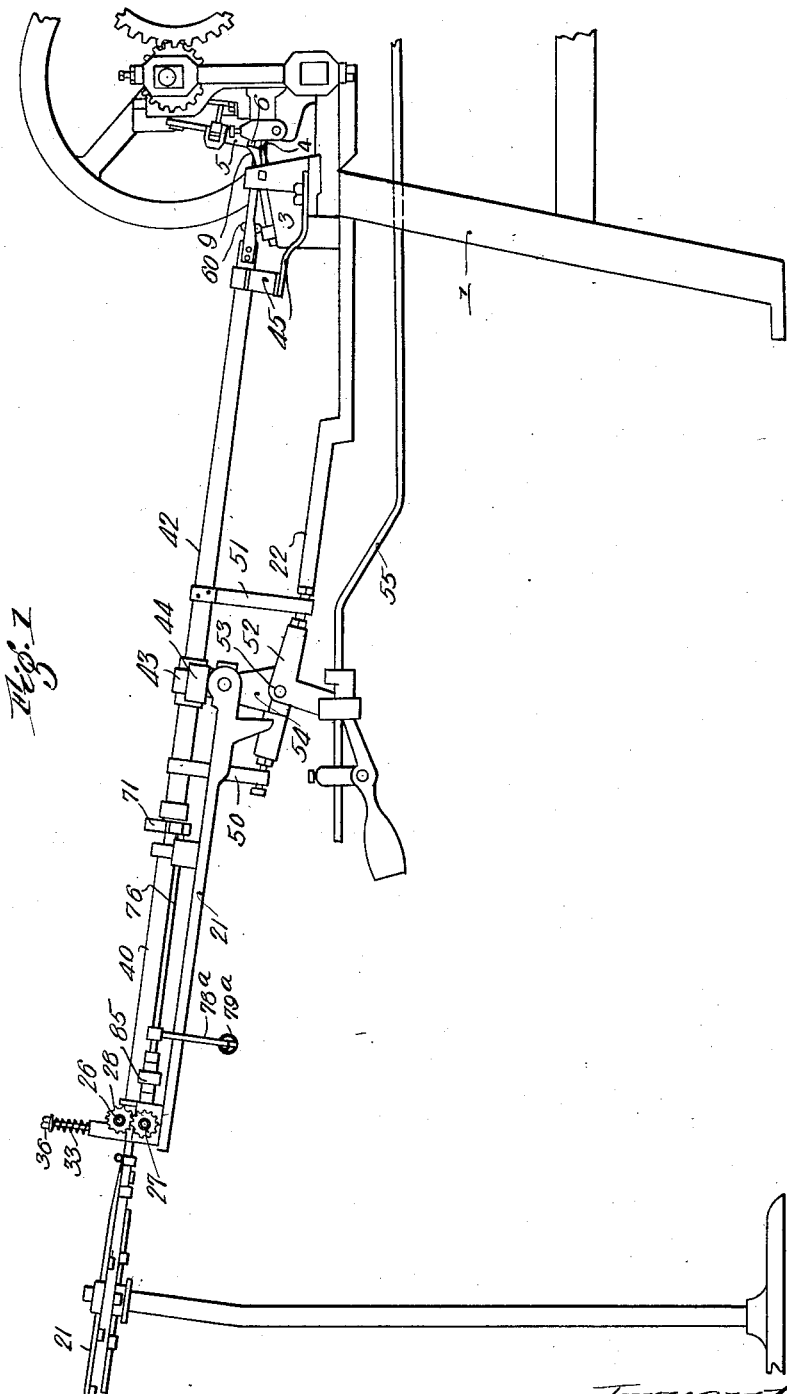

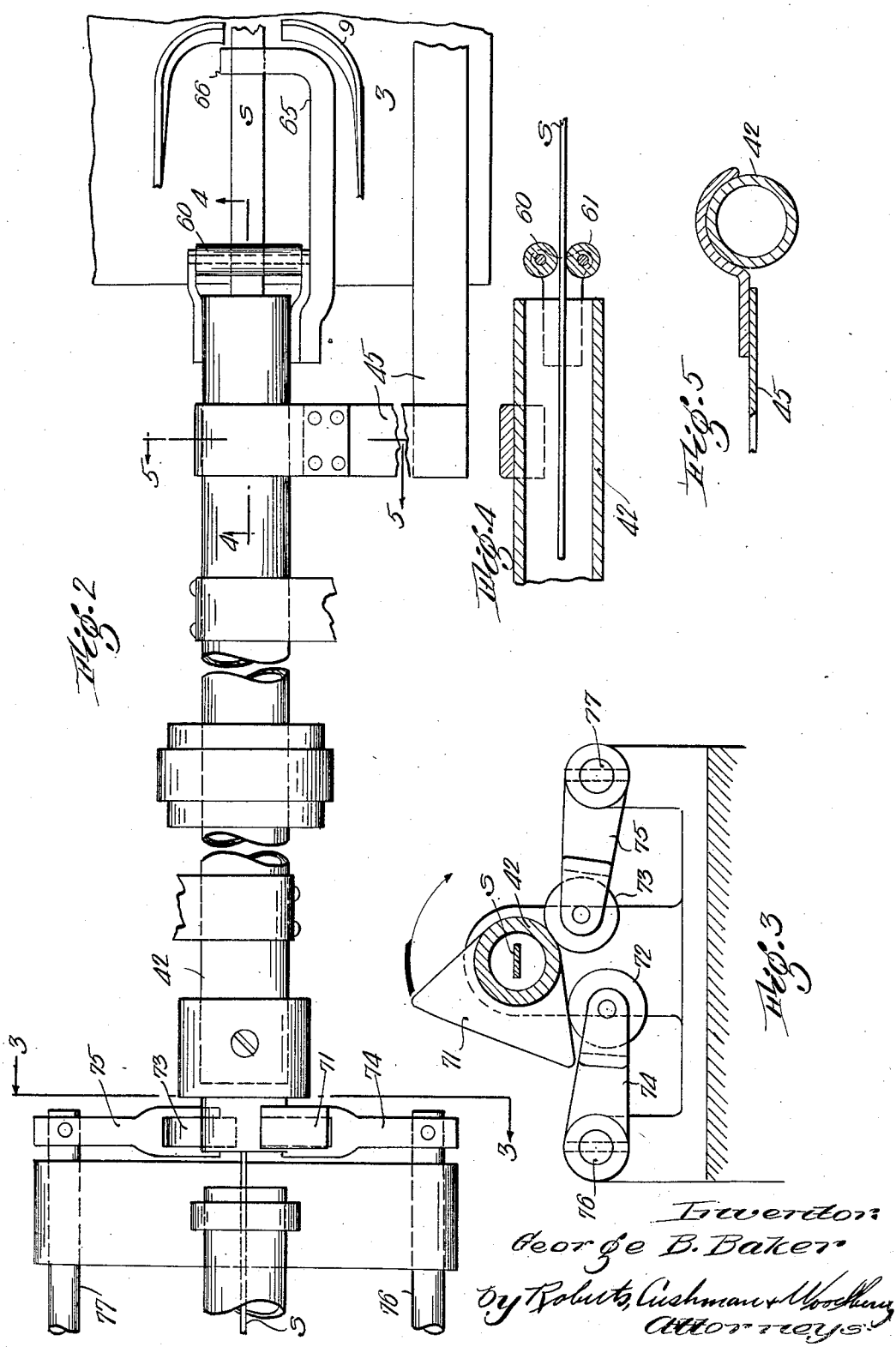

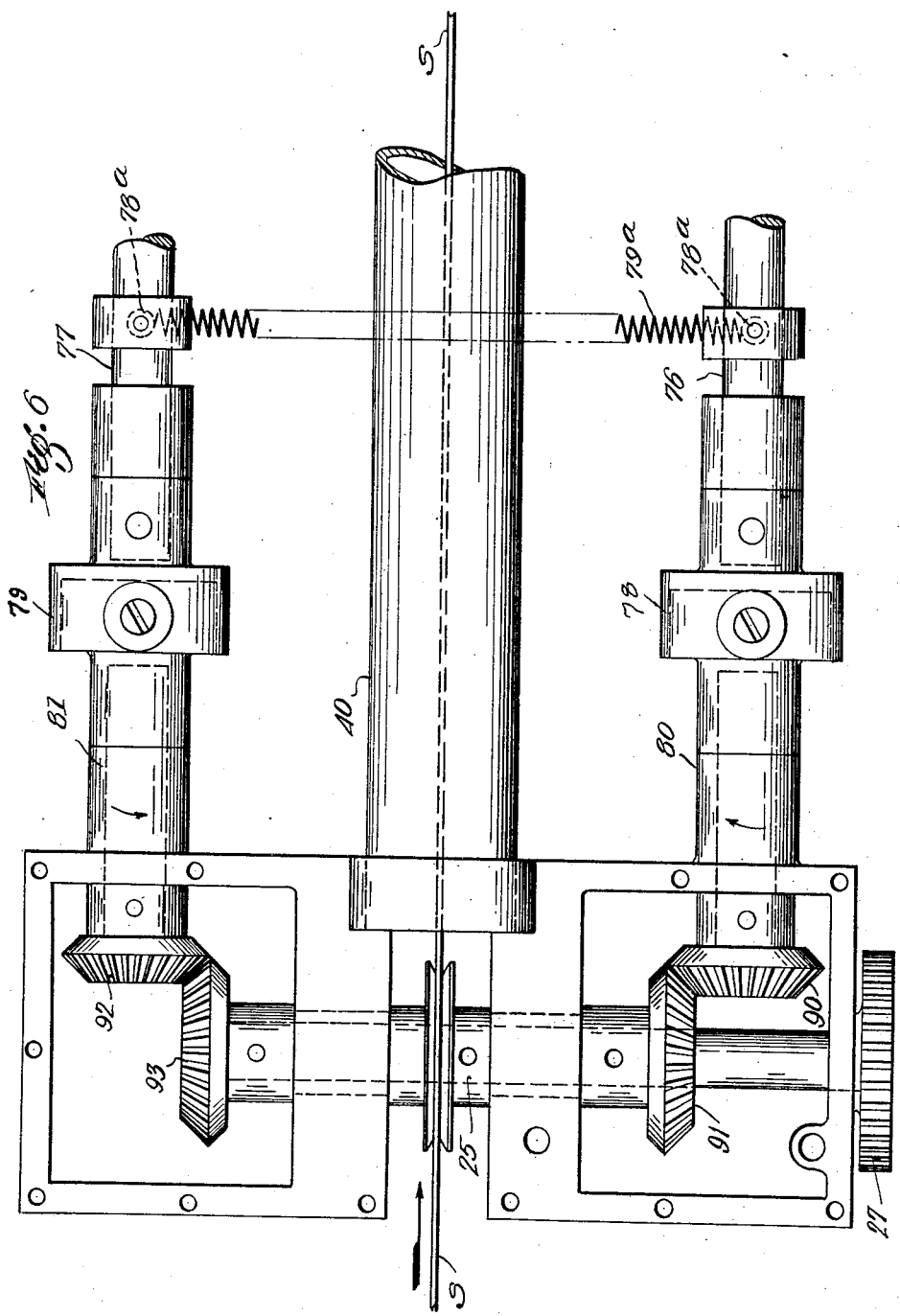

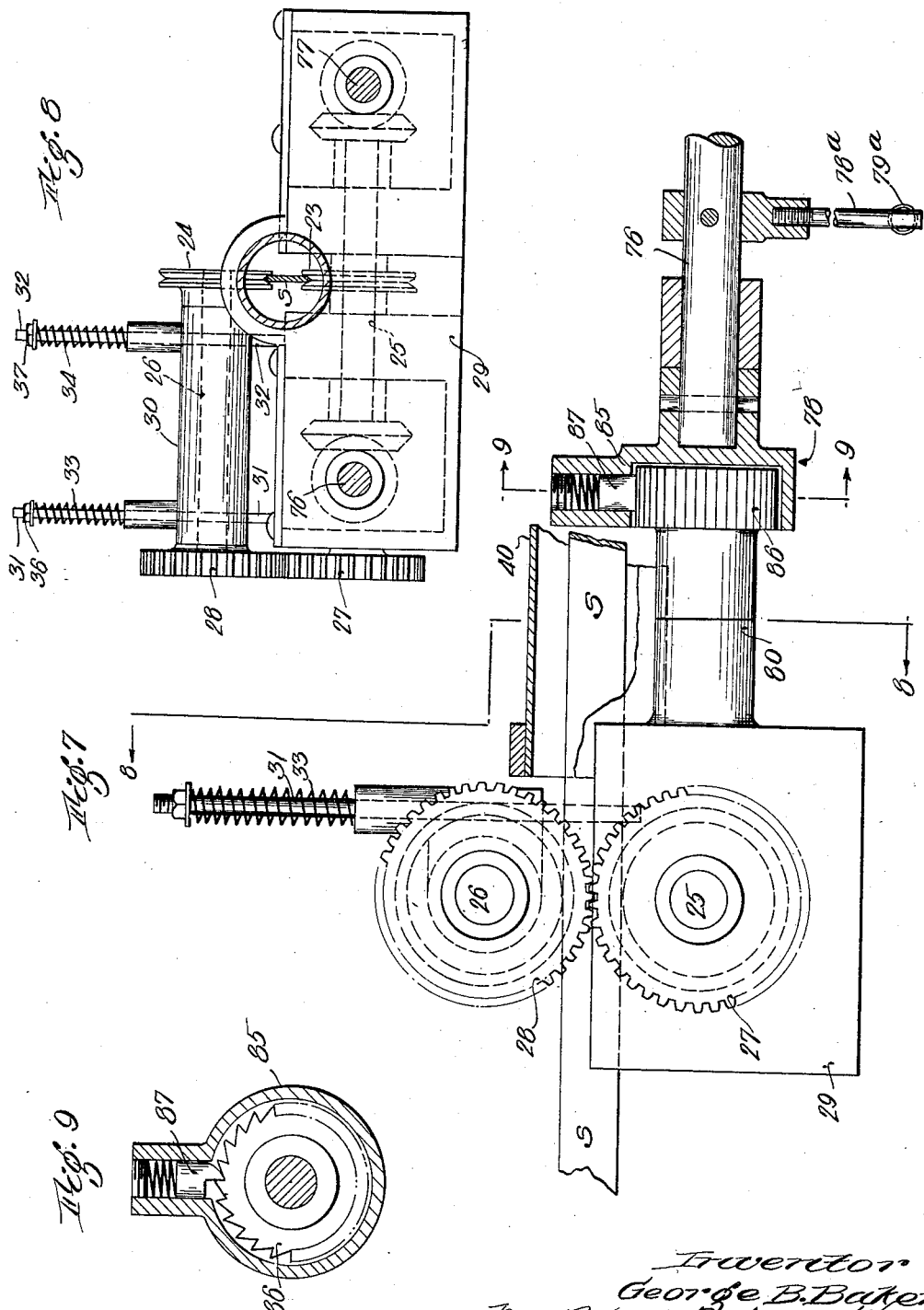

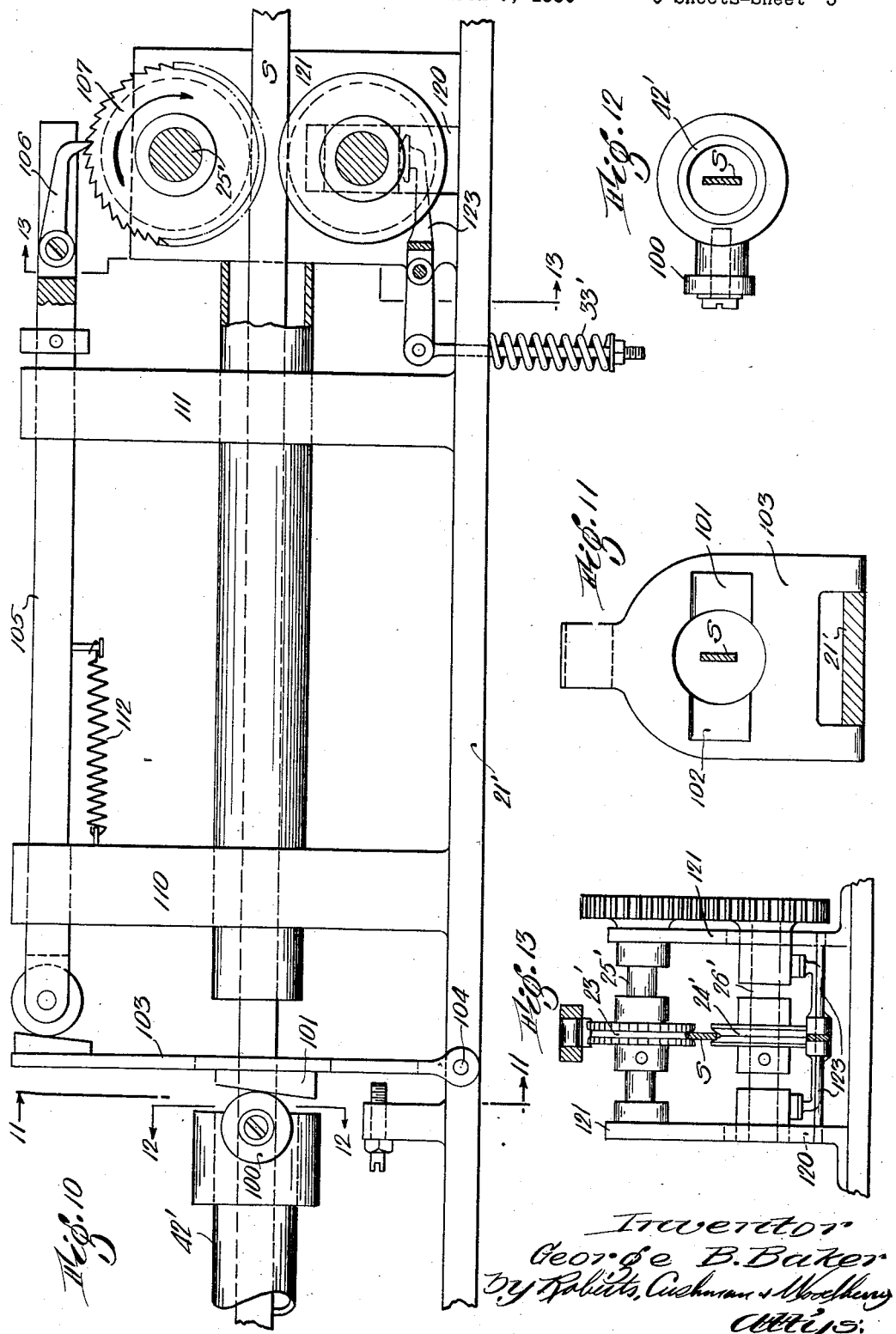

1,864,269

UNITED STATES PATENT OFFICE

GEORGE B. BAKER, OF BROCKTON, MASSACHUSETTS, ASSIGNOR, BY MESNE ASSIGNMENTS, TO EDWARD C. BAKER AND GEORGE B. BAKER, OF BROCKTON, MASSACHUSETTS, AS SURVIVING JOINT TENANTS

TACK MACHINE

Application filed March 5, 1930. Serial No. 433,290.

This invention relates to tack making machines of that type in which the tack strip is presented by successive intermittent advances to the cutting instrumentality and is turned over at each advance to enable generally triangular blanks to be cut without waste of material and pertains more especially to improved means for feeding or advancing the tack strip, being particularly suitable for use in feeding tack strip of great length delivered from a reel or equivalent source of supply.

My invention aims to provide a tack machine where in the functions of feeding the tack strip and turning it over are performed in a simple expeditious manner by the use of relatively simple mechanism which is easily accessible for inspection and maintenance, and which is sturdy, powerful and positive in its action, reliable, and not liable to accidental breakdown.

Further objects and advantageous features of my invention will be apparent from the following explanation of specific instances of my invention shown by way of example in the accompanying drawings in which:

Figure 1 is a fragmentary side elevation of a tack machine constituting one desirable embodiment of my invention;

Fig. 2 is a fragmentary plan view of the oscillatory blank supporting barrel of the machine, the guide at its forward end, and a portion of the feed mechanism;

Fig. 3 is a section on the line 3—3 of Fig. 2;

Fig. 4 is a fragmentary section on the line 4—4 of Fig. 2;

Fig. 5 is a fragmentary section on the line 5—5 of Fig. 2;

Fig. 6 is a fragmentary plan, to larger scale, of the device for feeding the blank into the machine;

Fig. 7 is a side elevation, partly in section, of that part of the apparatus shown in Fig. 6;

Fig. 8 is a section on the line 8—8 of Fig. 7;

Fig. 9 is a section on the line 9—9 of Fig. 7, and shows a ratchet clutch;

Fig. 10 is a side elevation, partly in section, of a modified form of mechanism for converting the oscillating movement of the blank supporting barrel into a step-by-step rotary movement;

Fig. 11 is a section on the line 11—11 of Fig. 10;

Fig. 12 is a section on the line 12—12 of Fig. 10; and

Fig. 13 is a section on the line 13—13 of Fig. 10.

While the present invention is not primarily concerned with the type of cutting instrumentalities employed, I have herein illustrated diagrammatically, by way of example, cutting mechanism such as disclosed in the patent to Baker et al., No. 1,555,933, October 6, 1925, and which comprises an anvil block 3, a fixed or ledger blade 4 provided with a diagonal cutting edge, and movable cutters 5 and 6 which cooperate with the diagonal edge of the fixed blade. These movable cutters 5 and 6 are actuated through cams, cranks and other motion-transmitting devices from a main shaft at this cutting end of the machine. The cutting instrumentality is shown as supported upon a suitable frame 1, which may be conveniently utilized also as a fixed support for cooperating stock-advancing and turning mechanisms now to be described.

In the illustrated embodiment I have shown the stock in the form of a long continuous ribbon-like strip, coiled for convenience in handling, and mounted upon a rotary reel 21 at the end of the machine farthest from the cutting instrumentality.

The device for feeding or advancing the tack strip is preferably located adjacent to the source of supply of the strip, and is retained upon a relatively fixed or stationary part of the machine shown in Fig. 1 as a base 21 extending rearwardly from a fixed arm 22 carried by the frame 1. In the illustrated embodiment, this feeding device includes as elements which react on the tack strip a pair of vertically disposed grooved wheels 23 and 24 (Fig. 8) which embrace the lateral or narrow edges of the tack strip S and force it forward toward the cutting instrumentality. By providing circumferentially grooved feeding wheels as shown, instead of plain or merely knurled wheels or rolls formerly employed, the feeding wheels are enabled to act also as guides for the tack strip, the strip being securely retained in a preferably vertical plane without any possibility of lateral displacement either in a vertical or horizontal direction. Thus, if desired, other guide members at the entrance end of the device may be eliminated. To insure even feeding and certainty of operation these feeding wheels 23 and 24 (Fig. 8) are caused to rotate at equal speeds by being secured on parallel shafts 25 and 26 (Fig. 7) respectively which are geared together by meshing gear wheels 27 and 28. As shown in Fig. 8, shaft 25 is arranged within a casing 29, being mounted in suitable bearings therein, while shaft 26 is carried by a vertically movable bearing 30 above the casing, said bearing being slidable up and down upon vertical pins 31 and 32. Springs 33 and 34 held under compression by nuts 36 and 37, yieldingly force downward the movable bearing 30 with its shaft 26 and attached feeding wheel 24. Feeding wheels 23 and 24 are thus enabled firmly to grip the stock and to feed it with a minimum of slippage, even when compelled as in the present embodiment, to exert force to pull off the tack strip from a coil of great length. Since the feeding wheels 23 and 24 retain the stock in a vertical position, no twist is acquired in unrolling the coil and the feeding wheels serve to prevent the necessary twist in the forward portion of the strip from being transferred to the portion between the reel and the feeding wheels.

From the strip feeding or advancing device the strip progresses forward through a stationary guide barrel 40, which confines and supports the stock but which is not an indispensable element of the construction.

At the forward end of this stationary barrel the stock passes into an oscillating blank-supporting and confining barrel 42 which forms part of the device for turning over the forward end of the strip between successive cuts. This barrel 42 is movably mounted for axial oscillating motion by the provision of a cylindrical collar 43 which turns freely in a cup bearing 44 carried by an extension 54 of the bracket 22. Means for oscillating the barrel is provided, for example by the provision of straps 50 and 51 wound in opposite directions around the barrel and having their lower ends secured to oppositely extending arms of a lever 52 fulcrumed at 53 to the extension 54. This lever 52 is rocked by means of a link 55 actuated from the main shaft.

At its forward end the oscillating barrel is provided with guiding and restraining means serving to transfer the oscillating movement of the barrel to the forward end of the blank. In the illustrated embodiment this function is performed by a pair of rolls 60, 61 (Fig. 4) and by a nose piece 65 extending over the anvil 3 and having a slot 66 through which the tack strip protrudes into position to be cut. In this manner the forward end of the stock strip is turned alternately upon one or the other of its flat sides by the strip-turning mechanism while the portion of the strip adjacent and in rear of the feeding rolls remains with its flat sides approximately vertical. The distance between the bodily oscillating rollers 60, 61 and the vertically-fixed feeding wheels is sufficient to enable the stock strip easily to twist the necessary amount without being weakened. The forward end of barrel 42 is retained near the anvil 3 by means of the flexible arm 45.

I have provided novel and simplified mechanism for causing the oscillating barrel to actuate the feeding mechanism. This mechanism, in the illustrated embodiments comprises cooperating cam and follower members, one of which is carried by the oscillating barrel and, as the barrel oscillates, imparts intermittent movement to the cooperating member which is carried by a relatively stationary part of the machine. From this latter member, motion is transmitted through intermittent grip mechanism, such as a ratchet mechanism, to the feeding wheels.

Referring to Fig. 2, a cam 71 is carried by the rear end of the oscillating barrel 42, and cooperates, upon oscillation of the barrel, with a pair of oppositely disposed roller followers 72 and 73 mounted on arms 74 and 75 fixed on shafts 76 and 77 respectively. In order to keep the roller followers in contact with the cam 71, I prefer to provide each of the shafts 76 and 77 with a downwardly depending arm 78$^a$ (Figs. 1 and 6) and to connect these arms with a tension spring 79$^a$, thus yieldingly forcing the roller followers up against the under side of the cam 71. The shafts 76 and 77 thus partake of oscillating movement imparted to them by the oscillating barrel.

Shafts 80 and 81 are aligned with shafts 76 and 77 respectively, and a ratchet, clutch 78 and 79, connected respectively to shafts 76 and 77, transmits motion to the shafts 80 and 81 causing the latter to rotate intermittently. The rachet clutches are so constructed as to cause shafts 80 and 81 to turn in opposite directions as shown by the arrows in Fig. 6.

A preferable construction for these ratchet clutches is shown in Figs. 7 and 9, wherein the clutch consists primarily in an outer casing 85 rigidly connected to the driving shaft, an inner toothed wheel 86 rigidly connected to the driven shaft, and a spring-pressed pawl 87 which transmits movement in one direction of the outer casing to the inner member but allows the outer casing to move freely in the opposite direction relative the inner member. The two ratchet clutches 78 and 79 are similar but have their toothed members and pawls oppositely disposed so that as already stated they drive the shafts 80 and 81 in opposite directions.

Intermittently rotating shafts 80 and 81 are operatively connected, through bevel gears 90, 91, and 92, 93, respectively, to the shaft 25 of the feeding roll 23, thus partially rotating the two feeding rolls 23, 24 (always in the same direction) and advancing the strip S upon each oscillation of the barrel 42.

In a modified construction shown in Figs. 10, to 13, mechanism of specifically different structure, but performing the same general functions, is provided for causing the oscillating barrel to actuate the feeding mechanism. In this embodiment a cam element, here shown as the roll 100, projects from the side of the oscillating barrel 42' near the rear end of the latter, and this roll contacts alternately with laterally spaced wedge-shaped protuberances 101 and 102 on a plate 103 which is pivoted at 104 to the base 21'. The oscillating movement of plate 103 is transmitted through a push-rod 105 having a pawl 106 at its rear end which imparts intermittent motion to a ratchet wheel 107 mounted on the driving shaft 25' of the strip-feeding wheel 23'. Suitable guides 110 and 111 are provided for the push-rod 105, and a spring 112 serves to retract the push-rod and pawl and yieldingly force the pivoted plate 103 with its wedge-shaped portuberances 101 and 102 against the cam roll 100.

The feeding mechanism of this modification also differs from that of the previously described embodiment in the structure employed in forcing the feeding wheels 23' and 24' toward each other to grip the stock strip S.

In this embodiment (Fig. 10) the ends of the shaft 26' of the lower feeding wheel 24' are confined within vertical slots 120 in upright supports 121, and the wheel 24' is held up against the tack strip S by means of a pivoted yoke 123 which is yieldingly forced against the shaft by the action of a spring 33'.

By using, (for example as shown in each of the above described embodiments) a cam and follower mechanism driven by the oscillating barrel for actuating a feeding device on a relatively stationary part of the device, I have considerably simplified the construction, while the use of the cam and follower mechanism renders possible an advantageous order of timing of the operations of cutting, turning over the cut end of the stock strip, and feeding or advancing the stock strip.

In machines of this type, the cutter blades usually, for practical reasons related to the formation of the severed tack-blank into a tack, continue their downward travel after performing their cutting function. Especially in this case, but also in case the cutter blades merely sever the stock strip and rise thereafter, it is undesirable to attempt to advance the stock-strip before it has been cleared by the cutter. The strip may, however, be turned over while the cutter is in its lower position and before it has cleared the strip. Accordingly it is desirable to initiate the turning movement of the strip soon after severance of an individual tack-blank, but to delay advancing the strip until the strip is cleared by the cutter. In each of the embodiments above described, the cam and follower device by means of which the oscillating barrel actuates the feeding mechanism, is adapted to actuate the feeding mechanism during the latter part only of the oscillation of the barrel, and thus delay feeding the strip operation until the cutter has cleared the strip. Referring to Fig. 3, and assuming that the barrel is about to turn to the right as indicated by the arrow, it will be apparent that follower 73 will not be actuated by cam 71 until near the end of the oscillation of the barrel, at which time the cutter will have risen above and cleared the strip. Referring to Figs. 10, 11 and 12 which show an alternate mechanism adapted to perform the same function, and assuming that the barrel 42' and roller 100 are about to turn over to the opposite position, it will also be apparent that the wedge-like block 102 and pivoted plate 103 will not be moved in the feeding direction (to the right as shown) until near the end of the oscillation of the barrel 42'.

Reviewing the operation of the device, the tack strip is fed into the device and presented to the cutting instrumentality by the successive advances of the feeding rolls, preferably being drawn from a reel as indicated in Fig. 1. The oscillating barrel with its strip guiding rolls 60, 61 and its guide bracket 65 successively turns over the forward end of the stock after each cut, and the improved and simplified mechanism described above for causing the oscillating barrel to drive the feeding rolls synchronizes the turning and feeding operations, preferably causing the advance of the feeding rolls to occur near the end of each oscillation of the barrel.

I claim:

1. A tack machine of the kind having cutting instrumentalities and an oscillating barrel for guiding a tack strip on its way to the cutting instrumentalities, said machine comprising means adjacent to the rear of the barrel for supporting a coil of tack strip, means supported independently of the barrel adjacent to the rear end of the barrel for advancing the strip along the barrel and means mounted on the barrel for actuating the strip advancing means.

2. A tack machine of the kind having a frame which supports cutting instrumentalities and an oscillating barrel through which the tack strip moves on its way to the cutting instrumentalities, said machine comprising a reel for supporting a coil of tack strip, means supported independently of the barrel adjacent to the rear end of the barrel for advancing tack strip through the barrel, and cam means carried by the barrel for actuating said advancing means.

3. A tack machine of the kind having a frame which supports cutting instrumentalities and an oscillating barrel through which the tack strip moves on its way to the cutting instrumentalities, said machine comprising a reel for supporting a coil of tack strip, feed rolls supported upon a stationary part of the machine frame at such a point as to enable them to deliver tack strip to the receiving end of the barrel, said rolls being also operative to advance the tack strip through the barrel, and means for intermittently turning the rolls always in the same direction, said means including a drive element carried by the barrel and partaking of the oscillatory movement of the latter.

4. A tack machine of the kind having a frame which supports cutting instrumentalities and an oscillating barrel through which the tack strip moves on its way to the cutting instrumentalities, said machine comprising a reel for supporting a coil of tack strip, feed rolls supported upon a stationary part of the machine frame at a point such as to enable them to deliver tack strip to the receiving end of the barrel, said rolls being also operative to advance the tack strip through the barrel, and means for intermittently turning said rolls, always in the same direction, at each oscillation of the barrel, said means comprising a cam element carried by the barrel and partaking of the oscillatory movement of the latter.

5. A tack machine of the kind having a frame which supports cutting instrumentalities and an oscillating barrel through which the tack strip moves on its way to the cutting instrumentalities, said machine including a reel for supporting a coil of tack strip, a pair of feed rolls supported independently of the barrel at a point such as to enable them to deliver tack strip to the receiving end of the barrel, a cam element mounted upon the barrel, and means actuated by the said cam element, as the barrel approaches the end of its oscillatory movement in each direction, for turning the feed rolls to advance the tack strip along the barrel toward the cutting instrumentalities.

6. A tack machine comprising a reel for supporting a coil of tack strip, a blank supporting barrel, a cutter at the forward end of said barrel, means for intermittently oscillating said barrel successively to present alternate sides of the blank to the cutter, a feeding device at the rear of the barrel for feeding a blank into the barrel, an oscillating cam carried by said barrel, a pair of oppositely disposed followers in the path of the cam, and ratchet connections between each of said followers and the feeding device, thereby to feed a blank forward into the barrel upon oscillation of the barrel in either direction.

7. A tack machine comprising a reel for supporting a coil of tack strip, a blank supporting barrel, a blank restraining and guiding device carried by said barrel at its forward end, a cutter at the forward end of said barrel, means for intermittently oscillating said barrel successively to present alternate sides of the blank to the cutter, a pair of feeding rolls at the rear of the barrel adapted to receive between them a blank and to feed said blank into the barrel, and means including an oscillating member carried by said barrel, for actuating one of said feeding rolls upon oscillation of said barrel.

8. A tack machine comprising a blank supporting barrel, a blank restraining and guiding device carried by said barrel at its forward end, a cutter at the forward end of said barrel, means for intermittently oscillating said barrel successively to present alternate sides of the blank to the cutter, a pair of feeding rolls at the rear of the barrel adapted to receive between them a blank and to feed said blank into the barrel, an oscillating cam and a pair of oppositely disposed followers in the path of the cam, a pair of rearwardly extending shafts connected respectively to said followers, a ratchet clutch associated with each shaft, a pair of shafts driven respectively by said ratchet-clutches, and a cross-shaft operatively connected to said last-named shafts and to one of said feeding rolls, whereby said feeding roll, and hence the blank, is advanced upon each oscillation of the barrel.

9. A tack machine including in combination a blank supporting barrel, a cutter at the forward end of said barrel, means for intermittently oscillating said barrel successively to present alternate sides of the blank to the cutter, a reel for supporting a coil of tack strip, a feeding device mounted upon a relatively stationary part of the machine in rear of the barrel and adapted to feed a blank into the barrel, and driving connections, including a cam on the barrel, between the oscillating barrel and the feeding device for actuating the feeding device upon oscillation of the barrel.

10. In a tack machine of the kind having a blank supporting barrel, a cutter at the forward end of said barrel, and means for intermittently oscillating said barrel successively to present alternate sides of the blank to the cutter, a reel for supporting a supply of tack strip, a feeding device mounted upon a relatively stationary part of the machine in rear of the barrel and operative to feed a blank tack strip into the barrel, said feeding device including a circumferentially grooved wheel positioned to engage the narrow edge of the tack strip and constituting guiding and feeding means for the strip.

11. In a tack machine having a blank supporting barrel, a cutter at the forward end of said barrel, and means for intermittently oscillating said barrel successively to present alternate sides of the blank to the cutter, a reel for supporting a supply of tack strip, a feeding device mounted upon a relatively stationary part of the machine in rear of the barrel and adapted to feed a blank tack strip into the barrel, said feeding device comprising a pair of opposed circumferentially grooved wheels turning about substantially horizontal axes and positioned to engage opposite narrow edges of the tack strip whereby accurately to maintain the advancing tack strip in a vertical plane.

12. A tack machine comprising a blank supporting barrel, a cutter at the forward end of said barrel, means for intermittently oscillating said barrel successively to present alternate sides of the blank to the cutter, means for supporting a coil of tack strip, a feeding device interposed between said strip supporting means and the rear of the barrel for advancing the tack strip into the barrel and means including a cam fixedly secured to the barrel for actuating said feeding device upon the latter part only of each oscillation of the barrel.

13. A tack machine comprising a blank supporting barrel, a cutter at the forward end of said barrel, means for intermittently oscillating said barrel successively to present alternate sides of the blank to the cutter, a reel for supporting a coil of tack strip, a feeding device mounted upon a stationary support at the rear of the barrel for feeding a blank into the barrel and means including an oscillating member partaking of the movement of the barrel for actuating said feeding device upon the latter part only of each oscillation of the barrel, an operative connection between the oscillating barrel and the feeding device for actuating the latter, said connection including a cam and follower mechanism driven by the cam during the latter part only of the movement of the cam, whereby said feeding device is actuated near the end of each oscillation of the barrel.

14. A tack machine of the kind having a frame which supports cutting instrumentalities and an oscillating barrel through which a tack strip moves on its way to the cutting instrumentalities, said machine comprising means for supporting a supply of coiled tack strip, means for intermittently advancing the tack strip along the barrel, said advancing means being supported independently of the barrel and arranged to receive the tack strip from the supply and deliver it to the receiving end of the barrel, and cam means carried by the barrel for driving said strip advancing means.

15. In a tack machine of the kind having a blank supporting barrel, a cutter at the forward end of said barrel, and means for intermittently oscillating said barrel successively to present alternate sides of the blank to the cutter, a reel for supporting a supply of tack strip, a feeding device mounted upon a relatively stationary part of the machine in the rear of the barrel and adapted to receive tack strip from the supply and to feed the strip into the barrel, said feeding device including means engaging the tack strip at its narrow edges and preventing lateral displacement of the strip both vertically and horizontally.

Signed by me at Brockton, Mass., this 28th day of February, 1930.

GEORGE B. BAKER.